No. 766,628.    Patented August 2, 1904.

UNITED STATES PATENT OFFICE.

WILLIAM BROWN KERR, OF MEDFORD, MASSACHUSETTS.

PROCESS OF SEPARATING FLUID PORTIONS FROM SOLID PORTIONS OF FATTY SUBSTANCES.

SPECIFICATION forming part of Letters Patent No. 766,628, dated August 2, 1904.

Application filed March 26, 1903. Serial No. 149,723. (No specimens.)

*To all whom it may concern:*

Be it known that I, WILLIAM BROWN KERR, a citizen of the United States, and a resident of Medford, in the county of Middlesex and State of Massachusetts, have invented a new and Improved Process for Separating the Fluid Portions from the Solid Portions of Fatty Substances, of which the following is a full, clear, and exact description.

My invention relates to a process for separating the oily fluid portions from the comparatively solid portions of fatty substances, such as tallow, lard, &c. I have made the discovery that a solution of papain, a substance made from the papaw-tree and having properties analogous to those of pepsin, is very useful when employed in a process for carrying out this purpose.

In practice I take two hundred pounds of lard or tallow and admix therewith one hundred pounds of water. These two substances being placed in a kettle, I boil them together for about twenty minutes and then cool the mixture down to about 120° Fahrenheit. I next dissolve one ounce of commercial papain in a quart of water and stir it into the mixture, continuing to stir it for about fifteen minutes. I next raise the admixture to the boiling-point and boil it for ten minutes and draw off the water from below the admixture, which is easily done, for the reason that the mixture floats upon the water. I then cool the admixture down to about 70° Fahrenheit, whereupon the oily and fluid substances separate from the solid portions, so as to leave two masses, one being the composite liquid substance commonly designated as "oleo" and consisting of an admixture of various oils comparatively free from solid portions, the other being a comparatively solid composite substance analogous to stearin. By subjecting the comparatively solid substance mentioned to pressure still more of the distinctly oily matter may be separated therefrom.

Having thus described my invention, I claim as new and desire to secure by Letters Patent—

1. The process herein described of separating the comparatively solid portions from the comparatively liquid portions of fatty substances, which consists in adding water to said substances, boiling and slightly cooling the admixture, adding a solution of papain thereto, boiling the entire admixture, separating the water therefrom and cooling the fatty substances to a point where the comparatively solid portions will separate from the comparatively liquid portions.

2. The process herein described of separating the comparatively solid portions from the comparatively liquid portions of fatty substances, which consists in boiling said substances in the presence of water, cooling the same slightly, adding thereto a solution of a vegetable digestive ferment, again boiling the admixture, separating the water therefrom, and finally allowing the comparatively solid fatty portions to separate from the comparatively liquid portions.

3. The process herein described of separating the comparatively solid portions from the comparatively liquid portions of fatty substances, which consists in boiling about two hundred pounds of said substances with about one hundred pounds of water for a period of about twenty minutes, cooling the admixture to about 120° Fahrenheit, dissolving about one ounce of papain in about one quart of water, adding the solution thus formed to the admixture stated, boiling the entire admixture for about ten minutes, drawing off the water therefrom, and finally allowing the comparatively liquid fatty portions to separate from the comparatively solid portions.

4. The process herein described of separating the comparatively solid portions from the comparatively liquid portions of fatty substances, which consists in boiling two hundred pounds of said substances with one hundred pounds of water for a period of twenty minutes, cooling the admixture to 120° Fahrenheit, dissolving one ounce of commercial papain in thirty-five ounces of water, adding the solution thus formed to the admixture stated, stirring the same for about fifteen minutes, boiling the entire admixture for ten minutes, drawing off the water from beneath the admixture, allowing the comparatively liquid fatty portions to separate from the comparatively solid portions by cooling the same to ordinary temperatures, and by the action of gravity, and finally applying pressure to the residue so as to still further separate the solid portions from the liquid portions.

In testimony whereof I have signed my name to this specification in the presence of two subscribing witnesses.

WILLIAM BROWN KERR.

Witnesses:
    LEWIS J. PIERCE,
    ANDREW KERR.